Aug. 1, 1967 M. H. M. VROLIJKS ET AL 3,333,332
METHOD OF MANUFACTURING PARTS OF ANNULAR MAGNETIC HEADS
Filed March 3, 1964
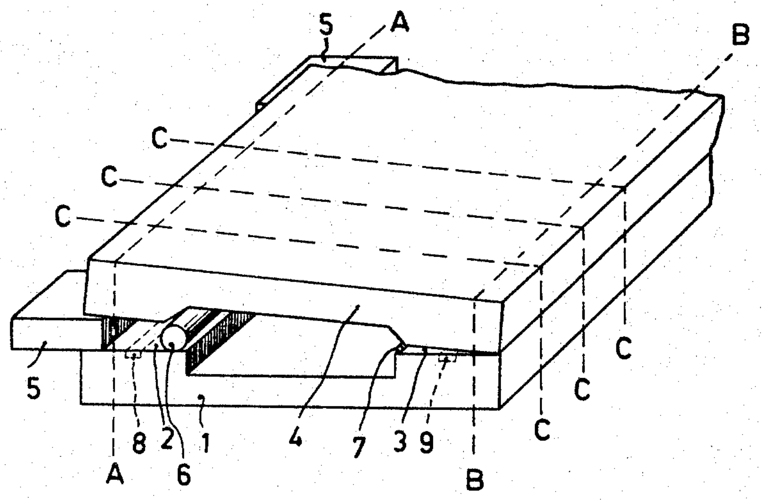
INVENTORS
MATTHIJS H.M. VROLIJKS
JACOB KOORNEEF
BY
Frank R. Trifari
AGENT 3,333,332

METHOD OF MANUFACTURING PARTS OF ANNULAR MAGNETIC HEADS

Matthijs Henricus Maria Vrolijks and Jacob Koorneef, both of Emmasingel, Eindhoven, Netherlands, assignors to North American Philips Company, Inc., New York, N.Y., a corporation of Delaware Filed Mar. 3, 1964, Ser. No. 349,184
Claims priority, application Netherlands, Mar. 5, 1963, 289,815
9 Claims. (Cl. 29—603)

This invention pertains to a method of manufacturing magnetic transducer heads; the method is particularly applicable to magnetic transducer heads composed of ferrite and having bonding glass gap spacers.

A method has previously been proposed for manufacturing parts of annular magneotic heads for recording, reproducing and/or erasing magnetic recordings, the head comprising at least two circuit parts of sintered oxidic ferromagnetic material which are separated by a very short useful gap filled with non-magnetic material which also bonds the circuit parts together. In the known method, at least one of two circuit parts is channel-shaped and the parts are placed with their gap-boundary faces on one another with the interposition of spacers. A quantity of glass or enamel in the form of grains, powder, or a coherent rod or plate is placed adjacent to or in the resulting gap or gaps between the circuit parts, the melting point of said glass or enamel being not higher than 900° C.; then the assembly is heated to the melting temperature of the glass or enamel and, after subsequent cooling, the whole block thus formed is divided mechanically into a number of head parts each with a gap having the desired width. This method therefore requires the use of spacers on both sides of the channel; the spacers must fulfill the requirement that their thickness be accurately the same. The spacers may be made, for example, of metal foil, glass foil or mica; in the case of magnetic heads intended for video-recordings, the thickness of the spacers must be no greater than from 1.5 to 2 microns. The requirement of equal thickness for spacers this thin is difficult to satisfy within a few percent.

The known method is based partly on the phenomenon of capillary action by which the glass or enamel is drawn into the gaps, and this action has been found to take place also when spacers are placed only at one side of the channel between the gap-boundary faces of the parts, while the parts themselves bearing on each other at the other side. When using spacers only at one side of the channels, the criticality with respect to accurately equal thickness is not as great. The advantage is also obtained that the gap-boundary walls make an angle (though very small) with one another, so that when wear of the running surface occurs in operation, the length of the gap becomes smaller; this is not objectionable and may even be advantageous. In any event, the gap length cannot become greater, and this is of considerable advantage since an increase in gap length may render the head useless for its intended purpose.

In one embodiment of the method according to the invention, the spacers have a thickness a little greater than the desired length of the gap and they are located only partly between the parts. The length of gap ultimately desired can thus be determined very accurately.

In another embodiment of the method according to the invention, the parts are pressed against one another by a light pressure during the heating process in order to prevent the spacers between the parts from being pushed away by the flowing glass or enamel.

Strong fusion of the parts with the glass or enamel is obtained if, in accordance with another embodiment of the method of the invention, each of the parts, if desired after polishing the gap-boundary faces and before placing the parts on each other, is heated for a short period to a temperature of from 800° C. to 1000° C.

In order that the invention may be readily carried into effect, one embodiment of the method according to the invention will now be described in detail, by way of example, with reference to the accompanying diagrammatic drawing.

The figure shows a channel-shaped part 1 of sintered oxidic ferromagnetic material having faces 2 and 3 which have been ground with great accuracy and, where necessary, polished optically plane. A part 4 of approximately identical shape and having corresponding faces likewise polished, is placed on the part 1, spacers 5 being interposed at one side; the two parts 1 and 4 bear on each other at the other side. The spacers 5 may be composed, for example, of metal foil, glass foil or mica and have a thickness from 1.8 to 2 microns if a magnetic head is desired having a gap length of 1.5 microns. The surfaces 2 and 3 may previously be thermally etched, after polishing, by heating the parts 1 and 4 from about 800° to 1000° C. After the parts 1 and 4 have been placed on one as shown, glass rods 6 and 7 are placed in the spaces or gaps between the faces and, subsequently, the resulting assembly is heated under a light pressure until the rods 6 and 7 have melted. Due to the capillary action of the gaps, the molten glass is drawn into the gaps and, after cooling, the gaps are found to be completely filled with glass. The parts thus joined are subsequently sawed into small blocks along the lines A—A, B—B and C—C, resulting in assemblies which, when finished further, can be used for magnetic heads.

Instead of glass rods 6 and 7, it is also possible to use enamel; also the glass or enamel can be brought against the gaps in the form of powder or be applied to them beforehand. As a further alternative, this may be effected by grinding recesses 8 and 9 for receiving the glass or enamel in the lower gap-boundary surfaces 2 and 3 respectively.

It is thus apparent that the comparatively costly spacers 5 are required at only one side. Since these spacers are especially difficult to manufacture with equal thickness, the method according to the invention makes the manufacture of the parts of the head cheaper and simpler. In addition, a head manufactured according to the invention affords the advantage that as the running surface wears out the length of gap becomes smaller and can never become greater. This is very important and advantageous especially for video recordings where the length of the gap must lie within very narrow limits. Further, the manufacture of extremely small gap lengths is much simplified since the line of sawing A—A may be displaced more to the right so that the length of gap of the head ultimately to be obtained is automatically reduced. Also the gap may have a practicably negligible length at the rear side of the head so that the efficiency of the head can be much increased.

While the invention has been specifically described above, it will be understood that many variations and modifications will be apparent to those skilled in the art without departing from the inventive concept, the scope of which is set forth in the appended claims.

What is claimed is:

1. A method of manufacturing portions of magnetic transducer heads having two circuit parts of sintered oxidic ferromagnetic material, one of said parts being channel-shaped and having at least one face of a gap-boundary at one side of said channel, the other of said circuit parts having another gap-boundary face, comprising the steps of: placing said second circuit part adjacent said first circuit part with the respective gap-boundary faces facing each other, interposing first and second spacing means between facing gap-boundary faces at one side of said channel, said spacing means each having a thickness greater than the desired gap length at said one side of said channel, maintaining said parts in abutting contact at the other side of said channel thereby to position said gap-boundary faces with their opposing surfaces in a non-parallel relationship, placing a quantity of fusible material adjacent to said gap faces, heating the resulting assembly to the melting temperature of the fusible material until the fusible material is drawn between the gap faces by capillary action, cooling said assembly removing said spacing means by cutting said assembly through the gap boundary faces to form a surface, and finishing said surface.

2. A method as recited in claim 1, wherein each spacing means has a portion located between said gap-boundary faces and another portion located beyond said gap-boundary faces.

3. A method as recited in claim 2, wherein said other portion is located outside of the volume constituted by said circuit parts.

4. A method as claimed in claim 1, further comprising the step of dividing the cooled assembly into a plurality of head portions having a desired gap width.

5. A method as recited in claim 1, wherein said parts are heated for a short period before being placed adjacent each other.

6. A method of manufacturing portions of magnetic transducer heads having two circuit parts of sintered oxidic ferromagnetic material, one of said parts being channel-shaped and having at least one face of a gap-boundary at one side of said channel, comprising the steps of: placing said second circuit adjacent said first circuit part with the respective gap-boundary faces facing each other, interposing spacing means between facing gap-boundary faces at one side of said channel, said spacing means having a thickness greater than the desired gap length at said one side of said channel, maintaining said parts in abutting contact at the other side of said channel, thereby to position said gap-boundary faces with their opposing surfaces in a non-parallel relationship, placing a quantity of fusible material adjacent to said gap faces, heating the resulting assembly to the melting temperature of the fusible material until the fusible material is drawn between the gap faces by capillary action, pressing said parts toward each other during the heating process, cooling said assembly removing said spacing means by cutting said assembly through the gap boundary faces to form a surface, and finishing said surface.

7. The combination of claim 6 further comprising the step of varying the gap length between the opposing surfaces of said gap faces by varying the degree of depth of insertion of said spacing means between said opposing surfaces of said gap faces.

8. A method as recited in claim 6, wherein said parts are heated for a short period before being placed adjacent each other.

9. A method as claimed in claim 6, further comprising the step of dividing the cooled assembly into a plurality of head portions having a desired gap width.

References Cited

UNITED STATES PATENTS

| | | | |
|---|---|---|---|
| 2,980,988 | 4/1961 | Vice ------------- | 29—155.59 |
| 3,117,367 | 1/1964 | Duinker et al. ----- | 29—155.5 |
| 3,246,383 | 4/1966 | Peloschek et al. ---- | 29—155.5 |

JOHN F. CAMPBELL, *Primary Examiner.*

R. W. CHURCH, *Assistant Examiner.*